(12) United States Patent
Tetterington et al.

(10) Patent No.: US 7,597,624 B2
(45) Date of Patent: Oct. 6, 2009

(54) LIGHT GUN SYSTEM FOR PLASMA AND LCD DISPLAYS

(76) Inventors: Kenneth Tetterington, c/o 7627 - 83 Avenue, Edmonton, Alberta (CA) T6C 1A2; Nan Liu, c/o 7627 - 83 Avenue, Edmonton, Alberta (CA) T6C 1A2; Francisco Schipperheijn, c/o 7627 - 83 Avenue, Edmonton, Alberta (CA) T6C 1A2

( * ) Notice: Subject to any disclaimer, the term of this patent is extended or adjusted under 35 U.S.C. 154(b) by 470 days.

(21) Appl. No.: 11/164,769

(22) Filed: Dec. 5, 2005

(65) Prior Publication Data

US 2006/0281561 A1    Dec. 14, 2006

Related U.S. Application Data

(60) Provisional application No. 60/593,051, filed on Dec. 3, 2004.

(51) Int. Cl.
*A63B 67/00* (2006.01)
*A63F 9/02* (2006.01)

(52) U.S. Cl. ............................. 463/51; 345/158; 463/37

(58) Field of Classification Search ............... 463/5, 463/36, 37, 38, 51, 53; 345/156–158, 179–183; 349/12; 324/770
See application file for complete search history.

(56) References Cited

U.S. PATENT DOCUMENTS 6,540,607 B2 *  4/2003  Mokris et al. .................. 463/5
6,992,803 B2 *  1/2006  Chang ......................... 358/509

* cited by examiner

*Primary Examiner*—Dmitry Suhol
*Assistant Examiner*—Wei Li
(74) *Attorney, Agent, or Firm*—Bennett Jones LLP

(57) ABSTRACT

A method and apparatus for determining a vertical and horizontal (X-Y) target shot position on a Liquid Crystal or Plasma display screen may be adapted to connect to commercially available video game console systems. Upon a trigger event from a light gun when it is pointed at the target shot position, a blanking signal renders the monitor black during a first vertical refresh cycle. During a second vertical refresh cycle, the voltage to each of the red, blue and green channels is increased in three separate screen sections to create a display split between the three colours. The light gun is adapted to be capable of separately detecting a blue, red or green light pulse and the X-Y coordinates of the target shot position is determined on the basis of the colour detected by the light gun and the length of time which elapses between the start of the second vertical refresh cycle and the detection of the red, blue or green light pulse.

8 Claims, 2 Drawing Sheets

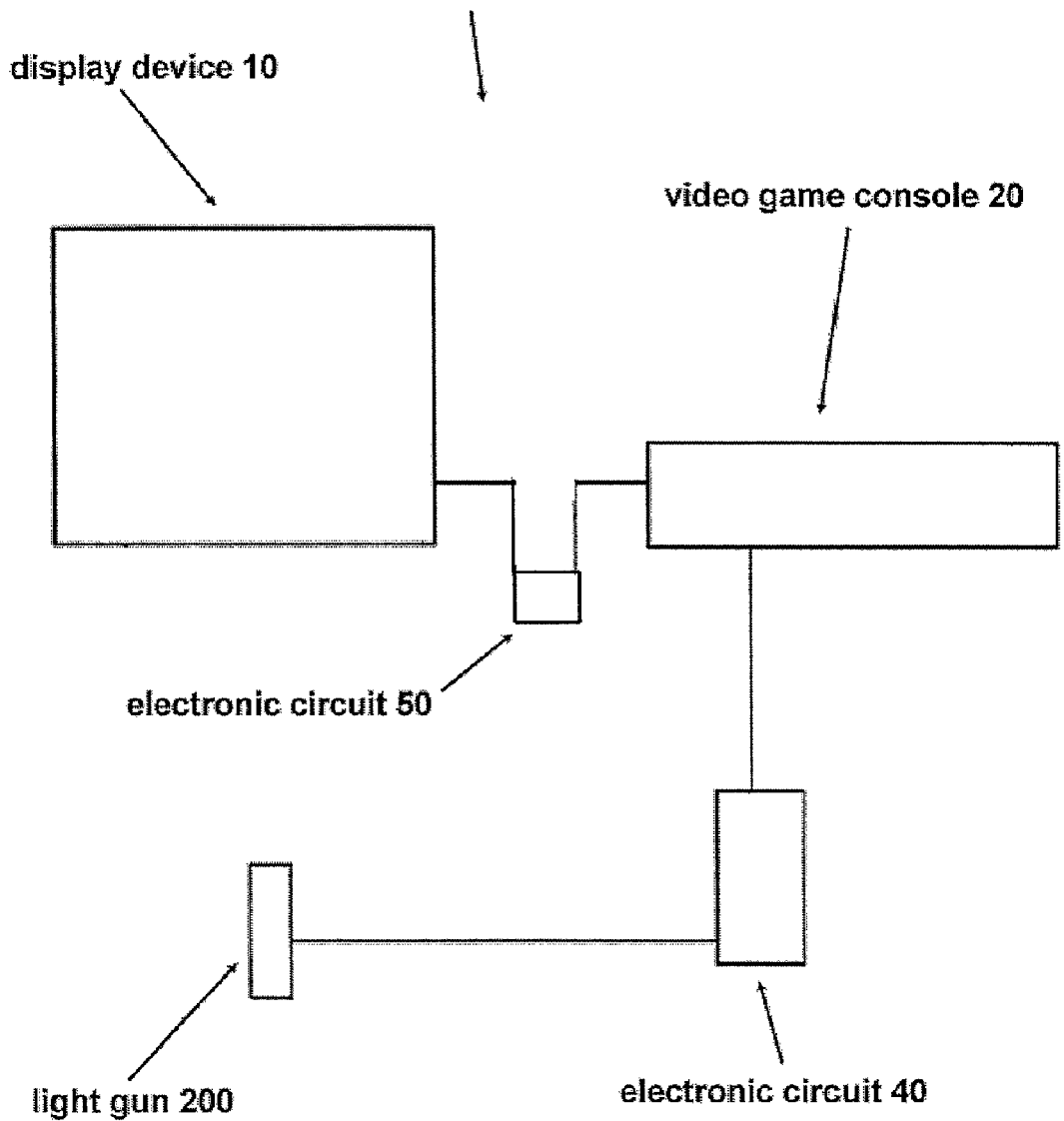

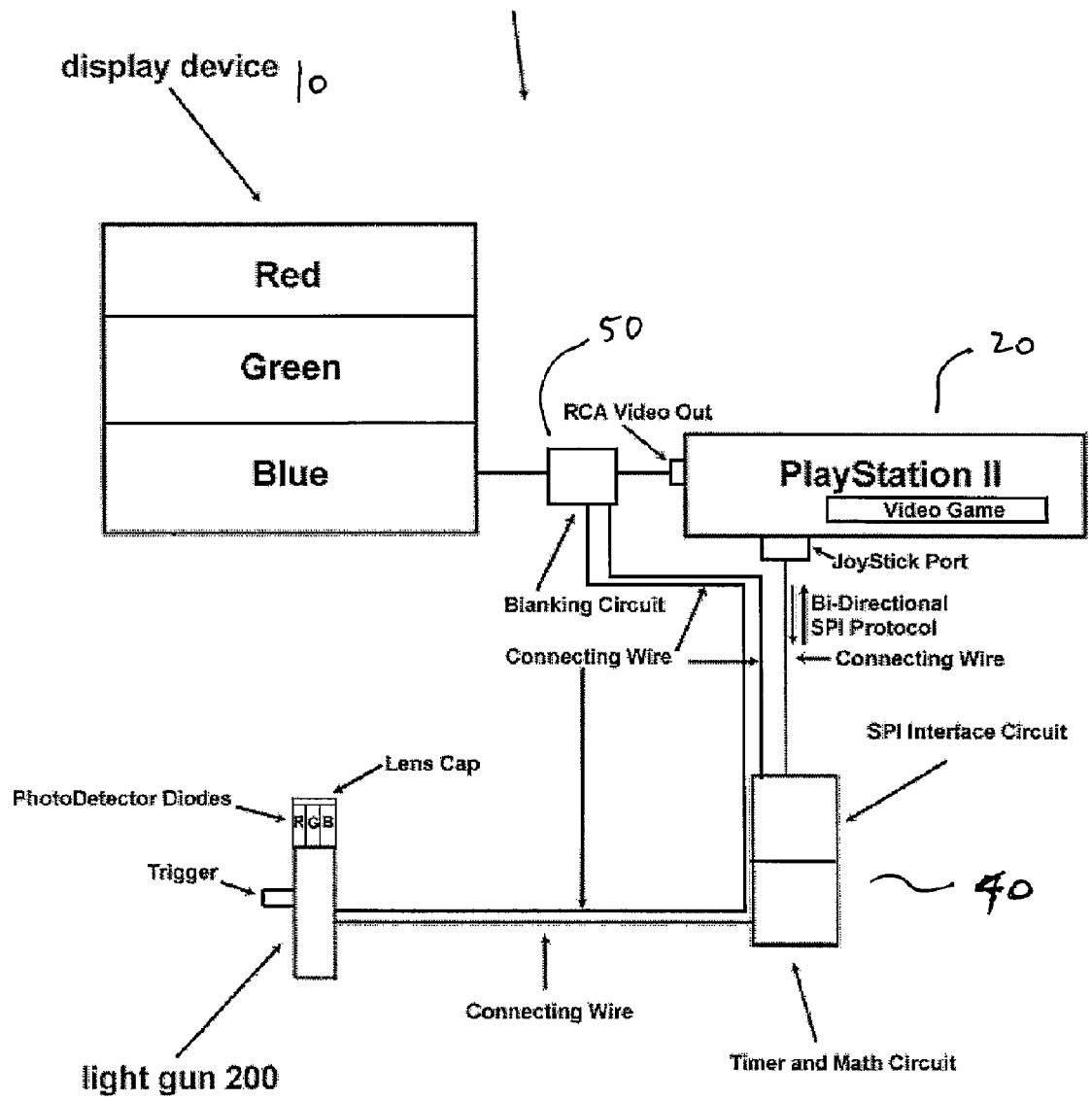

LIGHT GUN SYSTEM FOR PLASMA AND LCD DISPLAYS

CROSS REFERENCE TO RELATED APPLICATIONS

This application claims the priority benefit of U.S. Provisional Application No. 60/593,051 filed on Dec. 3, 2004 entitled "Light Gun System for Plasma and LCD Displays", the contents of which are incorporated herein by reference.

FIELD OF INVENTION

The present invention relates to a method and apparatus that allows interaction between a game player and a video game console system with a light gun.

BACKGROUND OF THE INVENTION

The present invention relates to a video game interface technique and, in particular, to a method and apparatus for determining an X-Y shot position with a light gun on various styles of Liquid Crystal Display (LCD) and Plasma Displays.

Recent advances in television and computer monitors that use LCD flat panel and plasma display systems have made current Cathode Ray Tube (CRT) display light guns obsolete. Past light guns and pen lights relied on the detection of a single horizontal and vertical retrace to detect a shoot position in X and Y coordinates. New display systems such as LCD and Plasma displays do not use a consistent horizontal and vertical retrace pulse as required by current light guns or light pens.

A CRT comprises a large vacuum glass tube in which a static charge is applied to the front of the display and electrons are released by an electron gun in the back of the tube. The electrons are attracted to the charge at the front of the tubes. When the attracted electrons strike the phosphorous coating on the front inside of the tube, the phosphorus glows which produces visual color. The electronic pulse is generated based on the modulated alternating current from the power supply. Typical North American power supply uses 60 hertz alternating electrical current. CRT displays use this 60 hertz alternating current to generate a saw tooth electronic pulse that in turn controls the timed release of electrons from the electron gun.

The electronic circuit in a CRT display system that generates the saw tooth pulse is called a fly-back transformer. The fly back transformer generates a saw tooth voltage increase that in turn increases or decreases the strength of an electromagnet. The increasing strength of the electro-magnet pulls the electron beam across a horizontal scan line that in turn produces a visual line across the CRT display. A horizontal pulse, generated by the fly back transformer, causes the voltage to drop and in turn causes the electro-magnetic strength to decrease which in turn causes the horizontal scan to start at the beginning of the line again. Each time a line is drawn horizontally, a similar process pulls the electron beam down one line that causes repeated horizontal scan lines to travel across and down the front of the CRT display. A vertical retrace pulse at the bottom-end causes the scan to start at the top-left corner of the display for a next frame.

Video games are software programs that use a video game console system to translate the game data. A controller allows a game player to move within the rendered video game program. Many video games include the use of a light gun, or a controller with a shoot button, to simulate shooting with a gun or other weapon.

Conventional light gun technologies detect the start of the vertical retrace pulse via electronic connections and have a photo-detector on the light gun, that detects the horizontal retrace line as the brightest phosphorous point on the screen. A mathematical calculation is applied in the light gun electronic circuit to calculate an X-Y position of the point on the screen that the gun has pointed at.

Current Liquid Crystal and Plasma displays do not use such electron beams to draw a screen image and therefore current light gun technologies do not work with such display systems. A need exists for a light gun that is able to determine an X and Y shot position on a Liquid Crystal or Plasma screen.

SUMMARY OF THE INVENTION

The present invention comprises a method and apparatus for determining a vertical and horizontal (X-Y) target shot position on a Liquid Crystal or Plasma display screen. The invention may be adapted to connect to commercially available video game console systems such as Sony Playstation™ versions or Microsoft xBOX™ versions and allows the video game player to use the invention while playing commercially available, unaltered video games.

Therefore, in one aspect, the invention comprises a method of determining the X-Y coordinates of a light gun target spot on a television or video monitor coupled to a video game console, the method comprising the steps of:
 (a) upon a trigger event from the light gun, initiating a blanking signal to render the monitor black during a first vertical refresh cycle;
 (b) during a second vertical refresh cycle, non-sequentially increasing the voltage to each of the red, blue and green channels in three separate screen sections to create a display split between the three colours;
 (c) polling the monitor during the second vertical refresh cycle with the light gun adapted to be capable of separately detecting a blue, red or green light pulse;
 (d) determining the X-Y coordinates on the basis of the colour detected by the light gun and the length of time which elapses between the start of the second vertical refresh cycle and the detection of the red, blue or green light pulse.

In one embodiment, after the determination of the target spot that the game player shoots the light gun at, electronic circuitry is used to intercept and alter the bi-directional signal output from a video game consoles system and joystick to insert a coordinate of a player movement to the X-Y target spot position.

In another aspect, the invention may comprise an apparatus for determining the X-Y coordinates of a a target spot of a light gun on a television or video monitor coupled to a video game console, the apparatus comprising:
 (a) a light gun comprising three light sensitive photodiodes, each separately filtered to be sensitive to blue, red, and green light;
 (b) a blanking circuit operatively connected to the light gun and to the video game console, or the monitor, for blanking the monitor;
 (c) a colour separation circuit for non-sequentially increasing the red channel voltage to a first section of the monitor screen, the blue channel voltage to a second section of the monitor screen, and the green channel voltage to a third section of the monitor screen;
 (d) means for determining the colour of the horizontal retrace when detected by the light gun, operatively connected to the light gun;

(e) a timer for determining the length of time which elapses between the start of a vertical refresh cycle during which the colour separation circuit is active and detection of the horizontal retrace by the light gun; and (f) computational means operatively connected to the timer for dividing the elapsed time by the length of the horizontal retrace time, and thereby determining the X-Y coordinates within the section of the screen corresponding to the colour detected.

BRIEF DESCRIPTION OF THE DRAWINGS

Embodiments of the present invention may be described in conjunction with the attached drawings. Through these drawings, like parts are designated by like reference numbers:

FIG. 1 is a schematic view of the invention including the electronics circuits 40 and 50 game console system 20, television 10 and light gun 200 described herein.

FIG. 2 is a schematic view of one embodiment of the invention including the electronics circuit 40, a Sony Playstation 2 game console system 20, controller 30, television 10 and light gun 50 described in accordance with the invention herein.

DETAILED DESCRIPTION OF THE PREFERRED EMBODIMENT

When describing the present invention, all terms not defined herein have their common art-recognized meanings. To the extent that the following description is of a specific embodiment or particular use, it is intended to be illustrative only, and not limiting of the claimed invention. One skilled in the art may modify or replace elements of the described invention, and remain within the scope of the claimed invention.

The preferred embodiment is a method and apparatus that allows determination of a target spot of a light gun when used in conjunction with a video game console system connected to a LCD or plasma display panel. In a preferred embodiment, the invention allows the user to play the game with a light gun rather than, or in addition to, a controller.

Games made by different manufacturers are not consistent in programming techniques that allow the game player to move within the rendered game world. The present invention may be adapted to accommodate a variety of video game programming techniques as well as accommodate a variety of display devices.

In its simplest form, a device of the present invention requires a source of power to supply the electrical needs to the various components described hereafter. A preferred electrical source is the power lead on the game console controller port however a variety of devices may be used and are readily available to supply power for the requirements of the invention. One skilled in the art will realize that alternate power supplies may employ batteries, power adapters, electrical generators or any other form of adequate power supply means.

It is preferred to use an electronic programmable chip to decode, modify and encode the bi-directional electronic signals sent between the controller and the game console, however a variety of synchronous chip arrays may be employed to accomplish the same results. One skilled in the art will realize that alternate electronic configurations other than electronic programmable chips can be employed to decode, modify and encode the bi-directional electronic signals.

However, in a preferred embodiment, pre-programmed chips are used which include compatible protocols already used by the selected game console, such as the Sony Playstation™ or Microsoft xBOX™.

It is preferred to use general existing light gun photodetector techniques however, the light gun assembly requires three separate photo-detectors. Each photo-detector will have a different colour filter, thus permitting determination of the colour of a light burst. For example, a red filtered photo sensor, green-filtered photosensor, and a blue-filtered photosensor may be used to allow detection of a coloured light burst, and determination of the colour. If the screen image is rendered in different colours, the determination of colour permits determination of a specific area of the screen, the light gun is pointing at.

Vertical and horizontal refresh pulses can be detected by a variety of means. One such method is to intercept the video signals from a video out of the display device, such as by connecting an RCA cable to the video game console's RCA output and detect the vertical and horizontal retrace signals with the use of electronic circuitry. Another method can employ a method of capturing the video signal inside the video game console, capture it between the video game console and display device or to capture the signals with the use of an external connected photodetector attached to the surface of the display. Each of the alternate methods would work as well. This detected electronic pulse is used to calculate the X-Y coordinates of the game players target spot.

In one embodiment, the apparatus decodes the data stream sent from the controller to the video game console system to calculate the vertical and horizontal pulse positions being sent to the television. One skilled in the art may employ a variety of methods to detect the vertical and horizontal retrace.

In a preferred embodiment, the invention includes the alteration of the video signal sent to the display device after a user presses the light gun shoot button. The invention employs an electronic circuit that causes the display device to first turn off all pixels to black through a screen refresh period. Turning the pixels black increases the contrast ratio of the refresh pattern on the following refresh cycle and thereby increases the accuracy of the light gun target spot detection. On the second refresh cycle following the trigger event, the invention causes the pixels in one section of the screen to red, the pixels in a second section to green and those in a third section to blue. Differing display devices may require this aspect of the invention to cause the display device to use differing colors across different sections of the display device. However, in a preferred method, the screen is split into three substantially equal vertical stacked sections, each with a different and distinct color. The light gun is then used to detect the separate colors, with the use of the light gun red, green and blue filters.

A system of the present invention, generally identified by reference numeral 100, will now be described with reference to FIGS. 1 and 2.

The invention 100 is adapted to work with or integrate a video game console system 20 that is designed and built by third parties. These video game console systems 20 are readily available from retailers with current brand names such as Sony's PlayStation™ I, Sony's PlayStation™ II, Microsoft's XBox™ and Nintendo's GameCube™. It should be apparent that the invention 100 herein described may be adapted to either older, current or future game console systems 20 as well as computer joystick systems, without departing from spirit or the scope of the claimed invention 100.

The invention 100 can be adapted to past, present or future controller or game control systems, and may be used in addition to or to replace a controller. In one basic embodiment, the invention comprises a trigger or shoot button that is used as a shoot control device that is required to control the video game play. It should also be apparent that the invention 100 herein described can be adapted to contain features from other either older, current or future controllers 30 or other game controllers on the invention, without departing from the spirit or scope of the claimed invention 100.

The invention 100 is intended to be used with a television or video monitor 10 which may comprise a CRT, LCD or Plasma display screen that employs an interlaced vertical scan, progressive scan, sectional scan or synchronous scan refresh mechanisms. Conventional televisions 10 use either an NTSC or PAL standard that refreshes the display at 60 or 50 times per second respectively. It should be apparent that the invention 100 herein described can be adapted to either older, current or future televisions 10 without departing from the spirit or the scope of the claimed invention 100. It should also be apparent that the invention 100 herein described can be adapted to either older, current or future display resolutions on the televisions 10.

The invention 100 comprises a light gun 200 that has three photo-detectors in the front of the light gun, each with a coloured lens or filter. In one embodiment, the first photo-detector may have a red filter 210, a second may have a green filter 220, and a third photo-detector may have a blue 230 color filter, permitting determination of the colour of a light detected by the photodetectors. The light gun 200 has a trigger 240 that the user may press while pointing the light gun 200 at the display device 10. In one embodiment, the light gun 200 is connected to the video game console system 10 via a wire to the controller 30 port circuit. It should be apparent that a variety of different color filters could be used as well as a variety of differing methods of connections between the invention 100 and the light gun 200 without departing from the spirit or the scope of the claimed invention 100.

Light gun 200 is connected to the television 10 via the video game console 20 RCA video out port. It should be apparent to one skilled in the art that video signals can be sent to the display device via S-Video, USB, Coaxial, wireless or any other variety of video formats that contain the required video signals without departing from the spirit or the scope of the claimed invention 100. Light Gun 200 electronic circuit 50 detects the television 10 vertical retrace and horizontal pulse which are used to calculate the X-Y target shot position of the light gun 200. AC household power provides a modulated 50 or 60 hertz alternating current which the video game consoles and display devices use for horizontal and vertical retrace timing pulses. The vertical retrace pulse can therefore be detected within the bi-directional data stream. As a result, the light gun 200 controlling electronic circuitry may be in between the controller and console system, designed within the controller, or inside the game console system.

Many modern video games employ a camera technique that allows the game player to move their game character inside the virtual world with the use of a controller, sometimes referred to a first-person or first person shooter games. Typical programming methods that are used to create a game world recalculate and reconstruct the game scene each time a player moves. Typical data streams are sequences of data that correspond to a controller button press. For example, on the Sony Playstation II, the buttons known as Right stick cause the look-at position of the player to be adjusted. By inserting data bits in the corresponding Right stick data stream, the game console renders an appropriate image.

In a preferred embodiment, the invention 100 utilizes an electronic circuit 40 between the light gun and the video game console that intercepts the coded signals sent from the video game console 20. Electronic circuit 40 receives power needs from game console system 20. Electronic circuit 40 uses a programmable semi-conductor chip that contains written instructions to decode the data stream sent from the game console 30 and inserts calculated and compatible code back into the bi-directional signal that adjusts the video game players 'x' and 'y' position according to the users light gun 200 established shot position on the television 10. Electronic circuit 50 is connected to the video game console system 20 and electronic circuit 40.

When a user presses light gun trigger 240, a signal is sent to electronic circuit 50 whereby a polling starts for the video vertical retrace pulse. When a vertical retrace pulse is detected, a blanking circuit connected to the video out port of the console, receives notice of trigger press, and sends a ground signal to the RCA video-out—this ground signal turns the screen pixels black (off). Thus, with the first vertical retrace pulse is registered after the trigger press, the screen is completely black.

The blanking circuit registers the vertical retrace and when it is received, begins a timer that is used to count the horizontal retrace pulses. On second pass of the vertical retrace pulse, for one section of the screen the green and blue are turned off while the voltage to the red channel is turned higher. For another section of the screen the red and blue are turned off and the green is turned high. For yet another section of the screen the red and green are turned off while the blue is turned high. Each of these three sections, which preferably are equal ⅓ sections, are drawn concurrently, or at least non-sequentially. This pattern causes ⅓ of screen to be bright red, ⅓ of screen to be bright green and ⅓ of the screen to be bright blue. Typically but not essentially, these ternary sections may be stacked vertically.

Certain TTF and LCD monitors have a dual horizontal or multi scan horizontal retrace that occurs simultaneously. As a result, the light gun detection sequence is able to determine which section of the screen the light gun is pointed at. The blanking circuit may optionally have a mode switch that allows for 50-50 split screen that is red-green in each half. Other refresh patterns such as single line patterns can be incorporated into the blanking circuit as well.

At the same time the screen is being redrawn in red-green-blue ⅓ sections, the light gun photo-detector is aimed at the target spot on the screen and registers a high current in one of the red, green or blue photo-detector diode as the horizontal retrace passes through the target spot, producing a light pulse. When the horizontal retrace is detected by one of the photo-detectors, the colour of the detected light pulse is recorded and a calculation is done based on the elapsed time of the vertical retrace pulse. Light gun poll time is equal to the time to complete a complete vertical retrace for each ⅓ section of the display screen less the time of horizontal retrace pulse. The poll time is then divided by the time it takes each horizontal retrace to scan across the screen. The whole number quotient gives the X (vertical) position of the light gun target spot, while the remainder of the calculation gives us the Y (horizontal) position of the light gun targetspot. X and Y may be in screen display coordinates. Thus, if the quotient is 200.75, then the X position is 200 rows down and the Y position is 75% of the screen width to the right, assuming a left to right horizontal scan direction.

The X position is determined by the colour separation on the screen and the colour detected by the light gun. For example, if the bottom section of the screen is blue, as shown in FIG. 2, and the light gun detects a blue horizontal retrace and the timing circuit calculates that the X position is 200 rows from the start of the vertical retrace, then the true X position on the entire screen is 200 rows down from the start of the blue section.

In one embodiment, a combination of the methods employed allow a video game player to use a bi-directional light gun rather than a joystick to play a video game on a Liquid Crystal or Plasma display. In this case, the device may employ an electronic method of decoding signals from a controller and recoding the data stream sent to the video game console system. In its simplest form, the invention can be connected to a game controller. In a preferred method, the joystick buttons and feedback features of a typical joystick or a game controller are incorporated into a light gun. One skilled in the art will realize that the joystick features such as button and feedback motors can be built into a light gun and not require a controller to control the game. The light gun of the present invention can be incorporated as an added feature to a past, existing or future video game console control device.

A programmed electronic chip may contains the functions to decode, modify and encode the controller signals by specifically altering each X, Y or Z component of the bi-directional data stream sent to the game console, in a manner that adjusts the game players new X, Y or Z desired position within the game coordinate grid. It should be obvious to one skilled in the art that a programmed electronic chip array and electronic circuit can be placed in between the controller connecting wire and the video game console system however the circuitry and algorithms can also be incorporated as part of controller electronics. Our claims for methods and apparatus are not limited to being placed between the controller and game console system.

In one embodiment, once the display device 20 screen coordinates are calculated for the target shot position, they may be passed back to the electronic circuit 40 where they are encoded and sent back to the game console system 10 as a player move in x and y game coordinates. This causes the video game to recalculate the players game position as a movement and render the game according to the look at position where the user pointed the light gun 200. Therefore, starting with the third vertical retrace cycle after the trigger press, the game will re-render the game scene according to the supplied coordinates at which time a shoot signal is sent to the video game console 10. Alternatively, the shoot signal may be sent to the video game console before the player look-at position is shifted. The game will then calculate a hit or miss according to the users targeted area and object on the screen in accordance with standard methods.

In one embodiment, the x and y position are calculated to be relative from the center of the screen. For example, if the screen is 1000×1000 pixels, then the center of the display is X=500, Y=500, and the three coloured sections start at line 333 and 667. If the light gun shot target X position is 700 it means that we need to move the game position may be moved 200 pixels down. If the light gun shot target Y position is 300, the game position is moved 200 pixels left.

In one embodiment, the method can include the step of restoring the player's original look-at position before taking the shot. For example, after the fifth vertical retrace pulse detected by electronic circuit 50 after the trigger press, a signal can be sent to the video game console 10 with the original user X-Y coordinates to restore their position prior to the light gun shoot sequence.

In one example, using a Sony Playstation™, the controller protocol is bi-directional and polls the joystick buttons 60 times per second. This protocol is in the form of a data stream that checks if any buttons on the controller are pressed and if they are, the various buttons are registered in the data stream as "on" in the appropriate packet of the data stream. Typical video games that are rendered in 3D, and allow the player to move in a first person perspective through the game normally use the left small joystick paddle to move left, right and forward and backward. The Sony Playstation™ uses industry standard SPI protocol packets that contain '0' if a button is not pressed and '1' if a button is pressed. The SPI interface circuit causes a data packet circuit of the present invention may be given the amount of counts to send a '1' into the SPI data packets, which is sent to the Sony Playstation game software. In one example—a '1' is sent into the SPI data packet-left joystick button press, a total of 20 times which moves the look-at position of the game player 20 steps to the left. The SPI data packet-down joystick button press may be sent a total of 20 times which moves the look-at position of the game player 20 steps down.

The result after the moves are registered into the SPI data packet, is that the original target position of the light gun is moved to the center of the screen. We then send the SPI data packet-shoot button a '1' which is registered in the game as a shot. The video game software then processes the information to see if the targeted position of the players shot was a hit or miss.

The SPI protocol data packet may then send the reverse information to move the player X and Y game position back to where it was before the shot was processed. This results in the game player not losing their position in the game and allows the game player to shoot at all areas of the screen.

It further allows our light gun to support video games that do not need to be custom built for a light gun and further gives the game player an advantage over complicated and difficult controller maneuvers.

The xBox™ uses a USB industry standard protocol rather than the SPI protocol that the Playstation™ uses. The methods and system are the same between the two video game console systems. One skilled in the art may easily modify the electronics for the data packet circuit to adapt to the USB protocol or future data stream video game console protocols. Other proprietary game consoles use protocols that one skilled in the art may easily recognize and adapt the present invention for use with.

What is claimed is:

1. A method of determining the X-Y coordinates of a light gun on a television or video monitor coupled to a video game console, the method comprising the steps of:
    (a) upon a trigger event from the light gun, initiating a blanking signal to render the monitor black during a first vertical refresh cycle;
    (b) during a second vertical refresh cycle, non-sequentially increasing the voltage to each of the red, blue and green channels in three separate screen sections to create a display split vertically between the three colours;
    (c) polling the monitor during the second vertical refresh cycle with the light gunadapted to be capable of separately detecting a blue, red or green light pulse;
    (d) determining the X-Y coordinates on the basis of the colour detected by the light gun and the length of time which elapses between the start of the second vertical refresh cycle and the detection of the red, blue or green light pulse.

2. The method of claim 1 wherein the light gun has a first photodetector having a red light filter, a second photodetector having a blue light filter, and a third photodetector having a green light filter.

3. The method of claim 1 wherein the red section, blue section and green section are rendered in vertically stacked sections.

4. The method of claim 1 further comprising the step of moving the player look-at position to the target spot after the X-Y coordinates are determined.

5. The method of claim 4 further comprising the step of moving the player look-at position to its original position before moving to the target spot.

6. An apparatus for determining the X-Y coordinates of a a target spot of a light gun on a television or video monitor coupled to a video game console, the apparatus comprising:
 (a) a light gun comprising three light sensitive photodiodes, each separately filtered to be sensitive to blue, red, and green light;
 (b) a blanking circuit operatively connected to the light gun and to the video game console, or the monitor, for blanking the monitor;
 (c) a colour separation circuit for non-sequentially increasing the red channel voltage to a first section of the monitor screen, the blue channel voltage to a second section of the monitor screen, and the green channel voltage to a third section of the monitor screen;
 (d) means for determining the colour of the horizontal retrace when detected by the light gun, operatively connected to the light gun;
 (e) a timer for determining the length of time which elapses between the start of a vertical refresh cycle during which the colour separation circuit is active and detection of the horizontal retrace by the light gun;
 (f) computational means operatively connected to the timer for dividing the elapsed time by the length of the horizontal retrace time, and thereby determining the X-Y coordinates within the section of the screen corresponding to the colour detected.

7. The apparatus of claim 6 wherein the first, second and third coloured sections of the monitor screen are vertically stacked in any order.

8. The apparatus of claim 6 further comprising movement code insertion means for inserting a game code moving the X-Y coordinates determined to be the shot target position to the centre of the screen.

* * * * *